Jan. 19, 1971   A. G. CANNONE   3,556,853
GRID FOR LEAD-ACID CELL
Filed June 5, 1969

INVENTOR
A.G. CANNONE
BY
ATTORNEY

United States Patent Office 3,556,853
Patented Jan. 19, 1971

3,556,853
GRID FOR LEAD-ACID CELL
Anthony G. Cannone, Cranford, N.J., assignor to Bell Telephone Laboratories, Incorporated, Murray Hill, N.J., a corporation of New York
Filed June 5, 1969, Ser. No. 830,603
Int. Cl. H01m 35/04
U.S. Cl. 136—36
11 Claims

ABSTRACT OF THE DISCLOSURE

The structural members or ribs of the grid for a lead-acid cell are proportioned so that the ratio of surface area to cross-section area is substantially identical for each member. Thus, the growth of each member with aging is substantially identical and the members maintain good contact with the active material between the members whereby the cell charge capacity is maintained for much longer periods than can be attained with present grids.

BACKGROUND OF THE INVENTION

(1) Field of the invention

This invention relates to lead-acid storage batteries and more particularly to a new grid design for such batteries.

(2) Description of the prior art

Significant numbers of lead-acid batteries, representing an investment of millions of dollars, are used for standby power in the telephone plant. Because of the large investment and very limited use, such batteries should have a useful life of considerably more than ten years. However, such battery lifetimes are not being realized.

A major cause of failure of lead-acid batteries results from the growth of the battery grid assembly on aging. The growth or expansion essentially affects the positive grids of the cell. The growth is caused in part by the formation of lead oxide products on the positive grid structure which is composed of lead or a suitable lead alloy. In a common grid structure having crossed members, the distance between the grid members tends to increase in all directions. That is, the grid tends to expand or grow away from all sides of the active material within the grid structure. The active material or paste does not remain flexible enough to adjust to the changes in the spacings. Thus, the active material loses contact with the grid structure and a significant drop in the capacity of the pasted grid results. Consequently a drop in total cell capacity also results. The loss of contact often increases to the point where the active material drops from the grid structure and falls to the bottom of the cell where it may cause other problems such as shorting other plates.

A significant improvement in the design of lead-acid cells was disclosed in United States Pat. 3,434,883, issued Mar. 25, 1969, to L. D. Babusci, B. A. Cretella, D. O. Feder, and D. E. Koontz. A divisional application, Ser. No. 778,901, filed Oct. 3, 1968, of the above-listed patent discloses the use of a circular grid having concentric members to reduce the problems caused by growth of the grid members. Growth is restrained by the use of a structurally strong retaining ring or member in the grid. However, even with this grid design, it has been found that the various grid members have different growths. Thus, the spacings between the members will vary with the age of the grid and some loss of contact between the grid members and the active material develops. Furthermore, the grid structure tends to distort because of the restraint on the growth of the grid members.

Accordingly, it is an object of this invention to enhance the ability of a lead-acid cell to maintain its charge capacity with aging.

A more specific object is to improve the grid structure of lead-acid cells to insure contact between the grid structure and the active material as the cell ages.

SUMMARY OF THE INVENTION

The foregoing objects and others are achieved in accordance with the principles of the invention by the use of a grid structure utilizing grid members having specified or preselected growth rates. The principles of the invention rest in part on the discovery that the growth of any grid member is a function of the ratio of the surface area to the cross-section area for that member. This ratio may be called the growth ratio. If all critical grid structural members are designed with preselected growth ratios, the growths of the members will likewise be substantially predetermined. Thus, the spacings between the members may be controlled throughout the life of the cell. For example, if all critical concentric grid members have substantially identical growth ratios, the spacings between the members will remain constant. This selection of growth ratios may be used to insure the maintenance of good contact between the grid members and the active material contained between these members. Thus, the charge capacity of the cell may be maintained at a satisfactory level for an extended period of time. In fact, the cell capacity will increase as the capacity from the active lead oxides produced by corrosion is added to the capacity kept available by virtue of the continued good contact between the initial active material paste and the grid structure.

BRIEF DESCRIPTION OF THE DRAWINGS

A more specific object is to improve the grid structure tion and the objects and features thereof may be gained from the following detailed description and accompanying drawings, in which.

DETAILED DESCRIPTION

Figure 1:
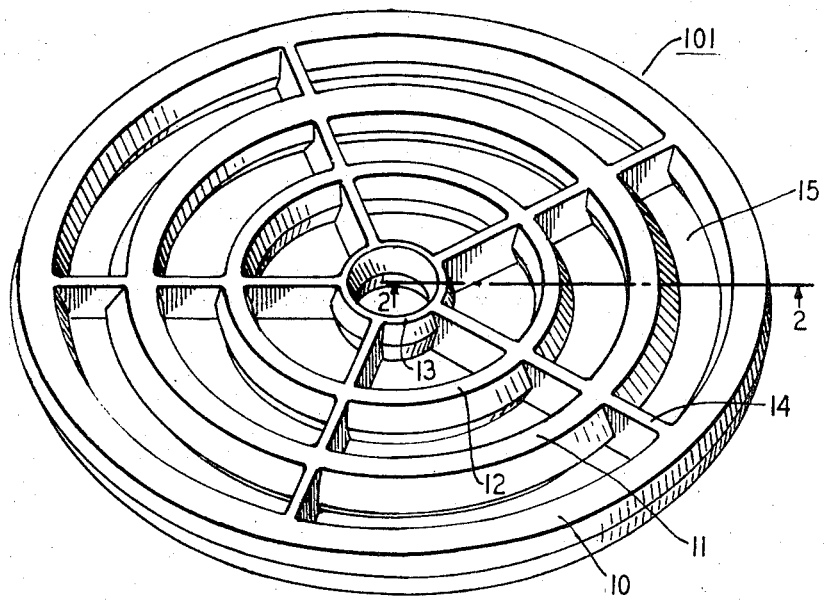
FIG. 1 is a perspective view of a circular grid structure made according to the principles of the invention.

FIG. 1 shows a generally circular grid structure 101 comprising concentric circular structural members 10, 11, 12, and 13 joined by radial structural members of which member 14 is typical. The number of members shown is merely illustrative. The interior and exterior circular members 10 and 13 may have any desired design, such as that illustrated in Pat. 3,434,883, referenced previously, to facilitate appropriate connection with the grid structure of adjacent plates which make up the lead-acid cell. The spaces 15 between the grid members are filled or pasted with appropriate active material by a procedure well known in the art. When the grid structure 101 is initially pasted, the active material is flexible or workable and good contact can be obtained between the material and structural members. After the pasted grid is electrochemically formed, the active material becomes rigid or ceramic-like in nature. Thus, if the spaces 15 change in size or shape, contact between the structural members and the active material may be lost. Initially, there often is an increase in cell charge capacity because of the formation of the lead oxide products on the grid members as they begin to grow. However, in presently used cells, as the cell ages and the spaces 15 change in size and shape, the loss of contact between the active material and the grid structural members eventually results in an unacceptable loss in retrievable cell storage capacity.

As the cell ages, the structural members of the positive grid and associated positive structure grow or expand in size due in part to the formation of lead oxides thereon.

Investigation by the inventor has disclosed that the growth of a grid member is a function of the ratio of surface area to cross-section area for that member. For example, the surface area of circular structural member 10 is the product of its circumference and the perimeter of its cross section shown in FIG. 2. Thus, the ratio of this surface area to the cross-section area 16 is the growth ratio of member 10.

If all structural members, which are concentric with member 10, i.e., members 11, 12, and 13, have the same growth ratios, these members will all grow the same amount during a specified period, and the distance 17 between the members would remain constant. Thus, these concentric members 10, 11, 12, and 13 would maintain good contact with the active material throughout the life of the cell and cell storage capacity would not decrease as it does in presently used cells. In fact the storage capacity of the cell will increase with age as a result of the capacity from the additional active lead oxides produced by the grid corrosion.

Figure 2:
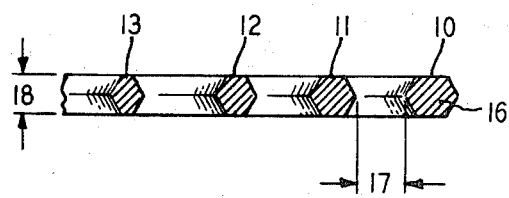
FIG. 2 is a sectional view along line 2—2 of FIG. 1.

The cross-section configuration for the concentric members 10, 11, 12, and 13 shown in FIG. 2 is essentially hexagonal. However, the particular configurations are not critical. The growth of a member is a function of the ratio of the two areas as previously discussed, and thus the various concentric members may have entirely different configurations as long as the growth ratios of all members are properly proportioned. Thus, a grid of constant thickness 18 as shown in FIG. 2 is formed by changing only certain dimensions of the grid members and holding other dimensions constant. Likewise a grid of tapered or wedge-shaped thickness could be formed by changing all dimensions of the concentric grid members proportionally. For example, if all grid members have a circular configuration, the grid will then have an inward taper. Likewise an outward taper could be obtained by an appropriate choice of configurations for the concentric members.

To insure a compressive contact between the grid structure and the active material at all times, the growth ratio for a particular member is selected as a function of the position of that member within the grid. That is, member 13 is given a slightly larger growth ratio than member 12. Thus member 13 will grow slightly faster than member 12 and a small compressive force will be maintained on the active material insuring a good contact. This same principle may be applied throughout the grid structure.

The same principles as discussed above apply to radial members 14 if it is desired to proportion these members for controlled growth. However, radial structural members 14 are not necessarily required to be proportioned for identical growths as are the concentric members 10, 11, 12, and 13. The radial members 14 need only be made flexible. For example, the members 14 could be small arcuate members. Thus, the growth of these radial members 14 will merely result in further flexing without appreciable stress being transmitted to the concentric members. If these radial members 14 are designed to flex in the same direction and pattern, they will continue to exert pressure on the active material contained between the members. Thus, contact is maintained with all sides of the active material pellets throughout the life of the cell.

The grid structure of any basic cell configuration could be designed according to the same principles as the circular grid illustrated herein. For example, the principle of proportioning the grid members to achieve identical growths of the various members is readily adaptable to a rectangular grid or to any other polygonal-shaped grid. Therefore, it is to be understood that the embodiment shown herein is merely illustrative of the principles of the invention. Various modifications thereto may be made by those skilled in the art without departing from the spirit and scope of the invention.

We claim:

1. A grid for a lead-acid cell comprising, in combination, a plurality of concentric members each having a preselected ratio between the surface area of said member and the cross-section area of said member, said ratio for any specified one of said members being no greater than said ratio for any other one of said members contained within said specified member, and means for supporting said members thereby to form a unitary structure.

2. Apparatus in accordance with claim 1 wherein said grid comprises a substantially circular structure.

3. Apparatus in accordance with claim 2 wherein said members comprise a plurality of substantially concentric rings and each of said supporting means comprises a substantially radial arcuate member.

4. Apparatus in accordance with claim 1 wherein said grid comprises a polygonal-shaped structure and said members comprise a plurality of concentric, polygonal-shaped members.

5. Apparatus in accordance with claim 1 wherein said supporting means comprises a plurality of second members each having a substantially identical ratio between the surface area of said member and the cross-section area of said member.

6. Apparatus in accordance with claim 1 wherein said preselected ratio of each of said members is substantially identical whereby each of said members has a substantially identical growth rate.

7. Apparatus in accordance with claim 1 wherein said preselected ratio for said specified member is smaller than said preselected ratio of any other said member contained within said specified first member.

8. Apparatus in accordance with claim 1 wherein said grid comprises a structure having a substantially wedge-shaped thickness.

9. A grid for a lead-acid cell comprising a structure having a plurality of concentric members with preselected growth rates, said growth rate for any specified member being no greater than said growth rate for any other member contained within said specified member.

10. A grid for a lead-acid cell made up of members which define a plurality of closed geometric shapes, one enclosed within the other, said members being so dimensioned that the ratio of the surface area to the cross-section area for members defining any outer such geometric shape is no greater than said ratio for members defining any such geometric shape contained within any such outer geometric shape.

11. In a pasted grid assembly for a lead-acid cell, a grid structure made up of members which define a plurality of closed geometric shapes, one enclosed within the other, said members being so dimensioned that the ratio of the surface area to the cross-section area for members defining any outer such geometric shape is no greater than said ratio for members defining any such geometric shape contained within any such outer geometric shape.

References Cited

UNITED STATES PATENTS

| 2,625,574 | 1/1953 | Fuller | 136—36 |
| 1,762,838 | 6/1930 | Shand | 210—166 |
| 3,434,883 | 3/1965 | Babusci et al. | 136—14 |
| 3,140,796 | 7/1964 | Broida | 220—66 |
| 3,204,804 | 9/1965 | Trombley | 220—19X |

FOREIGN PATENTS

| 419,957 | 4/1947 | Italy | 136—36 |

ALLEN B. CURTIS, Primary Examiner

A. SKAPARS, Assistant Examiner

PO-1950
(5/69)

UNITED STATES PATENT OFFICE
CERTIFICATE OF CORRECTION

Patent No. 3,556,853        Dated January 19, 1971

Inventor(s) Anthony G. Cannone

It is certified that error appears in the above-identified patent and that said Letters Patent are hereby corrected as shown below:

Column 2, lines 34 and 35,      delete "A more specific obje is to improve the grid struc tion" and insert --A more complete understanding of th present invention--.

Signed and sealed this 15th day of June 1971.

(SEAL)
Attest:

EDWARD M. FLETCHER, JR.        WILLIAM E. SCHUYLER, J!
Attesting Officer                  Commissioner of Patent: